United States Patent
Ayres et al.

(10) Patent No.: US 6,788,443 B2
(45) Date of Patent: Sep. 7, 2004

(54) ASSOCIATIVE WRITE VERIFY

(75) Inventors: Mark Ayres, Boulder, CO (US); Kevin Curtis, Longmont, CO (US); Brian Riley, Firestone, CO (US)

(73) Assignee: Inphase Technologies, Inc., Longmont, CO (US)

(*) Notice: Subject to any disclaimer, the term of this patent is extended or adjusted under 35 U.S.C. 154(b) by 151 days.

(21) Appl. No.: 10/067,209

(22) Filed: Feb. 7, 2002

(65) Prior Publication Data

US 2003/0048494 A1 Mar. 13, 2003

Related U.S. Application Data

(60) Provisional application No. 60/315,714, filed on Aug. 30, 2001.

(51) Int. Cl.[7] ................................ G03H 1/26
(52) U.S. Cl. .................................... 359/22; 359/25
(58) Field of Search ....................... 359/22, 24, 25, 359/32

(56) References Cited

U.S. PATENT DOCUMENTS

| | | | |
|---|---|---|---|
| 3,657,473 A | 4/1972 | Cocoran | 386/128 |
| 4,860,253 A | 8/1989 | Owechko et al. | 365/125 |
| 5,416,616 A | 5/1995 | Jenkins et al. | 359/11 |
| 5,671,090 A | 9/1997 | Pernick et al. | 359/561 |
| 5,754,691 A | 5/1998 | Hong | 382/210 |
| 5,920,536 A | 7/1999 | Campbell et al. | 369/103 |
| 6,064,586 A | 5/2000 | Snyder et al. | 365/125 |
| 6,175,543 B1 | 1/2001 | Burr et al. | 369/103 |
| 6,468,699 B2 * | 10/2002 | Lahrichi | 430/1 |
| 6,482,551 B1 * | 11/2002 | Dhar et al. | 430/1 |

* cited by examiner

Primary Examiner—Mark A. Robinson
Assistant Examiner—Alessandro Amari
(74) Attorney, Agent, or Firm—Morrison & Foerster LLP

(57) ABSTRACT

Associative retrieval techniques of this invention allow a holographic recording device to simultaneously query a plurality of storage locations for the presence of a given data pattern. The techniques use a known pattern common to one or more storage locations to simultaneously verify the success of one or more write operations.

52 Claims, 3 Drawing Sheets

ASSOCIATIVE WRITE VERIFY

RELATED APPLICATIONS

This application claims priority from Provisional Application Serial No. 60/315,714, filed Aug. 30, 2001, entitled "ASSOCIATE [sic, ASSOCIATIVE] WRITE VERIFY," the entire disclosure of which is incorporated herein by reference.

FIELD OF THE INVENTION

The present invention relates in general to information storage media, and more particularly, to holographic data storage systems (HDSS). More specifically, this invention relates to methods and devices for associative, or content-addressable, data retrieval. The invention can also be applied to a device that does not support associative retrieval.

BACKGROUND

Holographic data storage is accomplished by intersecting two coherent light beams in a photosensitive medium in order to record a hologram. Data retrieval is accomplished by illuminating the hologram with a replica of one of the beams, thereby causing a replica of the other beam to be reconstructed through the physics of holography. In the case of sufficiently thick media, a plurality of holograms (a hologram "stack") may be recorded in the same location (or in overlapping locations).

A hologram is a volume or film of photosensitive material that records the interference pattern of two light sources. To create a hologram, laser light is first split into two beams, an object beam and a reference beam. The object beam is then manipulated and sent into the photosensitive material. Once inside this material, it intersects the reference beam and the resulting interference pattern of laser light is recorded in the photosensitive material, resulting in a hologram. Once a hologram is recorded, it can be viewed with the reference beam alone. The reference beam is projected into the hologram at the exact angle it was projected during recording. When this light hits the recorded diffraction pattern, the object beam is regenerated out of the diffracted light. An exact copy of the object beam is sent out of the hologram and can be read by optical sensors. For example, a hologram that can be obtained from a toy store illustrates this idea. Precise laser equipment is used at the factory to create the hologram. A recording material that can recreate recorded images out of natural light is used so the consumer does not need high-tech equipment to view the information stored in the hologram. Natural light becomes the reference beam and human eyes become the optical sensors. Generally, white light holograms use a variation in the recording process, not special media.

In order for holographic technology to be applied to computer systems, it must store data in a form that a computer can recognize. In current computer systems, this form is binary. In the previous section, it was mentioned that the source beam is manipulated. In common holograms, this manipulation is the creation of an optical image such as a ball or human face. In computer applications, this manipulation is in the form of bits. The next section explains the spatial light modulator, a device that modulates laser light with binary data.

Typically in the prior art, the two beams are assigned distinct roles. The "object beam" is modulated in some manner (e.g., with a spatial light modulator, or "SLM") that allows it to carry data. A spatial light modulator is used for creating binary information out of laser light. The SLM is a 2D plane, consisting of pixels that can be turned on and off to create binary 1's and 0's. An illustration of this is a window and a window shade. It is possible to pull the shade down over a window to block incoming sunlight. If sunlight is desired again, the shade can be raised. A spatial light modulator contains a two-dimensional array of "windows" which are only microns wide. These windows block some parts of the incoming laser light and let other parts go through. The resulting cross section of the laser beam is a two dimensional array of binary data, exactly the same as what was represented in the SLM. This is correct right in the plane of the SLM, but as the beam propagates diffraction could cause the cross section to evolve into other shapes. After the laser beam is manipulated, it is sent into the hologram to be recorded. This data is written into the hologram as page form. It is called this due to its representation as a two dimensional plane, or page, of data.

The other beam, the "reference beam," is drawn from an enumerable set of possible reference beams (e.g., plane waves incident at differing angles) designed to have characteristics favorable to the holographic recording process. A plurality of data-bearing object beams may be recorded in the same volume of medium and retrieved independently provided that each is paired with a distinct reference beam during recording.

Holographic storage media take advantage of the photorefractive effect described by David M. Pepper et al., in "The Photorefractive Effect," Scientific American, October 1990 pages 62–74. The index of refraction in photorefractive materials can be changed by light that passes through them. By controllably changing the index of refraction in such materials, information can be stored in the photorefractive material in the form of interference patterns (or holograms). Holographic storage systems allow for high-density, high-capacity, and high-speed storage of information in photorefractive and photopolymers (or holographic) storage media.

A hologram stores data in three dimensions and reads an entire page of data at one time, which is unlike an optical CD disk that stores data in two dimensions and reads one bit at a time. The advantages of recording a hologram are high density (storage of hundreds of billions of bytes of data), high speed (transfer rate of a billion or more bits per second) and ability to select a randomly chosen data element in 100 microseconds or less. These advantages arise from three-dimensional recording and from simultaneous readout of an entire page of data at one time.

A hologram is a pattern, also known as a grating, which is formed when two laser beams interfere with each other in a light-sensitive material (LSM) whose optical properties are altered by the intersecting beams. Before the bits of data can be imprinted in this manner in the LSM, they must be modulated by a SLM to be represented as a pattern of clear and opaque squares on a display such as a liquid crystal display (LCD) screen, a miniature version of the ones in laptop computers. A blue-green laser beam, for example, is shined through this crossword puzzle-like pattern called a page, and focused by lenses to create a beam known as an object beam. A hologram of the page of data is created when the object beam meets another beam, called the reference beam, in the LSM. The reference beam could be collimated, which means that all its light rays propagate in the same direction. The term for "synchronized" light is "coherent," and coherence is necessary for holography. Such waves are known as plane waves. The grating created when the signal and reference beams meet is captured as a pattern of varying refractive index in the LSM.

After recording the grating, the page can be holographically reconstructed by shining the reference beam into the LSM from the same angle at which it had entered the LSM to create the hologram. As it passes through the grating in the LSM, the reference beam is diffracted in such a way that it recreates the original object beam and the information contained on it. The reconstructed object beam is then focused into an image of the original page onto a detector such as an array of electrooptical detectors that sense the light-and-dark pattern, thereby reading all the stored information on the page at once. The data can then be electronically stored, accessed or manipulated by any conventional computer.

As explained above, in the typical holographic storage system, two coherent light beams are directed onto a photosensitive storage medium. The first coherent light beam is an object beam, which is used to encode data. The second coherent light beam is a reference light beam. The two coherent light beams intersect within the storage medium to produce an interference pattern. The photosensitive storage medium records this interference pattern by changing its index of refraction to form a diffraction grating.

The recorded information, stored as a hologram, can be read by illuminating the hologram with a reference beam. A hologram is not really an image, though it is often referred to as an "image." When the hologram is illuminated with a reference beam at an appropriate angle, an object beam containing the information stored is produced. The resulting object beam is then typically focused onto a sensor such as a Charge Coupled Device (CCD) array or an active pixel sensor. The sensor is attached to a decoder, which is capable of decoding the data.

More than one hologram may be stored in the same volume by "multiplexing," for example by varying the angle of the reference beam during recording. Accordingly, high storage capacity can be obtained since the same volume can be used to store multiple holographic recordings.

For a typical data retrieval operation, a replica of the reference beam is used to illuminate the hologram, and a replica of the object beam is reconstructed. Detecting and decoding the modulated object beam thereby allows the retrieval of the stored data.

A conventional read head reads one bit at a time, a holographic read head reads one page at a time. Because data is stored as page data in a hologram, the retrieval of this data may also be in this form. Page data access is the method of reading stored data in sheets, not serially as in conventional storage systems. Holographic memory reads data in the form of pages.

In principle, the holographic physics do not distinguish between the signal and reference beams. Thus, the converse operation is also possible. If a replica of an object beam illuminates a hologram stack, then a replica of the reference beam used to record that object beam will be reconstructed. If several identical object beams have been recorded with different reference beams, then each of those reference beams will be simultaneously reconstructed. Furthermore, if a probe object beam ("probe beam") that is not necessarily identical to any of the recorded object beams is used, then the reference beams associated with every object beam in the hologram stack will be simultaneously reconstructed with intensity in proportion to the correlation coefficient of the probe beam with the recorded object beam. Then, the reconstructed reference beams could be detected, indicating the address of the desired recorded object beams.

More particularly, the associative holographic data retrieval is has the following features. The amount of power diffracted into each "output" beam is proportional to the 2D cross-correlation coefficient between the input data page of the probe beam and the stored data page (previously recorded with that particular reference beam). Each set of output beams can be focused onto a detector array, so that each output beam forms its own correlation "peak." The center of each correlation peak represents the simple overlap between the input data page of the probe beam and the associated stored page in the holographic recording medium. The term "coefficient" above is used to distinguish from a correlation "function," which is evaluated at all possible offsets between the two functions. In this invention, the optical correlation process merely provides the 2-D cross-correlation coefficient. When the input data page of the probe beam contains patterns that correspond to some data fields stored in the holographic recording medium, the optical correlation process allows the simultaneous querying of a plurality of storage locations for the presence of the given data patterns.

This is one basis for associative holographic data retrieval as contemplated in the prior art. By creating a probe beam that contains a datum or data of interest, a holographic storage device can query an entire stack of holograms simultaneously and locate those data pages that are highly correlated with the probe beam. These are the data pages that will (probably) contain the datum of interest.

It is the associative holographic data retrieval that gives content-addressable holographic data storage an inherent speed advantage over a conventional serial search, especially for large databases. For instance, if a conventional hard-disk drive has a readout rate of 25 MB/s, a search over one million 1 KB records would take about 40 s. In comparison, a holographic system could search the same records in about 30 ms, which is 1200× improvement.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding crystal such as iron-doped $LiNbO_3$ crystal. U.S. Pat. No. 6,103,454, entitled RECORDING MEDIUM AND PROCESS FOR FORMING MEDIUM, generally describes several types of photopolymers suitable for use in holographic storage media. The patent describes an example of creation of a hologram in which a photopolymer is exposed to information carrying light. A monomer polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded object beam 120 with a reference beam 122 at a location on or within holographic storage medium 114. The interference creates an interference patterns (or hologram) that is captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Object beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data may pass through one or more lenses 134 and is detected by sensor 116. Sensor 116 is, for example, a charged coupled device or an active pixel sensor. Sensor 116 typically is attached to a unit that decodes the data.

The quality of the recorded hologram as measured by such parameters as diffraction efficiency, multiplexing selectivity, and image fidelity is directly influenced by a variety of details specific to each system implementation. U.S. Pat. No. 5,416,616 (Jenkins) makes a statement to the effect of measuring the "fidelity" of a holographic copy.

U.S. Pat. No. 6,175,543 (Burr) contains a variety of techniques to improve the performance of content-addressable holographic memories. It contemplates modifying the reference beam, organizing the data patterns and conditioning the correlation signal. All these techniques are purported to improve the correlation signal-to-noise ratio during an associative read or search operation.

U.S. Pat. No. 5,754,691 (Hong), like Burr, discloses methods for improving the performance of a holographic correlator. In particular, it describes a process for normalizing the correlation strengths by the overall hologram strengths in order to more accurately establish the true degree of correlation. By contrast, for "Associative Write Verify" the degree of correlation is (in principle) already known, and it is the actual hologram strength that is determined.

U.S. Pat. No. 5,671,090 (Pernick) discusses the use of an optical correlation to search a database for a given "sequence," particularly for searching genetic databases for DNA sequence matches. This is a traditional application of a content-addressable memory that does not address the fundamental role of "Associative Write Verify," that is, data integrity verification in a storage device.

U.S. Pat. No. 5,416,616 (Jenkins) discloses a technique for copying multiple holograms simultaneously using multiple light sources that are self-coherent but mutually incoherent. U.S. Pat. No. 4,860,253 (Owechko) addresses practical concerns for implementing a content-addressable holographic memory. When a partial and/or distorted image is presented as a search key to an associative memory, the result of the optical correlation is a partial and/or distorted version of the reference beam(s) used to write those records that correlate well with the search key. The patent discusses feedback methods for deriving a clean version of this reference beam(s) so that the associated records may be recovered cleanly. It does not seem to address optical correlation as a write verification tool. U.S. Pat. No. 3,657,473 (Corcoran) is an old patent that describes a method of recording analog video holographically mentioning about interchanging the roles of the reference and object beams for optical correlation, but does not mention using this property for data verification.

In short, the prior art references relate to associative retrieval for the function of content-addressable memory during read operations. Nowhere do the prior art references appear to contemplate the use of an associative verification step for a write operation in order to assure data integrity, which is a feature of this invention. Furthermore, the implementation of a content-addressable memory is considerably more complex than what is required to implement the associative write verify method of this invention.

SUMMARY OF THE INVENTION

An embodiment of this invention is an associative write verify system for a holographic recording medium, comprising (1) a hologram, (2) an object beam, (3) a reference beam, (4) a probe beam, (5) a reconstituted reference beam and (6) means for comparing the reference beam with the reconstituted reference beam, wherein the system implements an associative write verify during holographic recording. The system could further comprise a stored address with a one-to-one correspondence to the reference beam and a code comprising a data pattern within the object beam. The probe beam could be modulated to match the code. The means for comparing the reference beam with the reconstituted reference beam could comprise means for detecting the reconstituted reference beam. The associative write verify could be selected from the group consisting of a parallel associative write verify, a post-glimpse page-wise verify and combinations thereof. The stored address could correspond to a hologram page or a reference beam angle used to record a hologram page. The stored address could be stored in a microprocessor RAM memory or in a portion of the holographic recording medium. The code could be a pattern in a hologram page or information from different hologram pages. The probe beam could be generated by an object beam modulator. The reference beam could be a plane wave reference beam generated using scanning mirrors or an array of laser beam generators. The reconstituted reference beam could be collected by a lens. The means for comparing the reference beam with the reconstituted reference beam could comprise a hardware or software comparator.

The system could further comprise means for associative, post-glimpse page-wise verify. The means for associative, post glimpse page-wise verify could comprise detection of the reconstituted reference beam while an original data pattern remains on a modulator after writing.

The holographic recording medium could be an optically flat planar medium. The reconstituted reference beam could be detected with a photo detector.

In one variation, the holographic recording medium is a holographic recording medium comprising a polymer matrix. The holographic recording medium could have a Rayleigh ratio ($R_{90°}$) of less than $7 \times 10^{-3}$ cm$^{-1}$. The holographic recording medium could have a thickness greater than 200 $\mu$m and a refractive index contrast ($\Delta$n) of $3 \times 10^{-3}$ or higher.

In one variation, the system could have a probe pattern and/or geometry capable of detecting and identifying the reconstituted reference beam. The probe pattern and/or geometry for an angular multiplexing system could comprise a lens to intercept the reconstituted reference beam and focus the reconstituted reference beam into a resolvable spot on a detector array, the reconstituted reference beam being a plane wave. The probe pattern and/or geometry could be capable of collecting the reconstituted reference beam with a lens and imaging an origin of the spherical beam onto a detector, the reconstituted reference beam being a spherical beam. The probe pattern and/or geometry could comprise optical elements for separating the propagating modes of the reconstituted reference beam into separated mode reconstituted reference beams and resolving said separated mode reconstituted reference beams onto a detector. The code could comprise one or more substantially mutually orthogonal modulation codes for marking a copyright status of data within a page recorded in the holographic recording medium.

Another embodiment is a method for associative write verify system for a holographic recording medium, comprising (1) interfering an object beam with a reference beam onto the holographic recording medium to form a hologram; (2) shining a probe beam; (3) forming a reconstituted reference beam and (4) comparing the reference beam with the reconstituted reference beam, wherein the method implements an associative write verify during holographic recording.

The method of could further comprise impinging the reconstituted reference beam upon a holographic optical element, wherein the reconstituted reference beam is recorded with a corresponding collimated or spherical index beam. The reconstituted reference beam could be reconstituted in a system comprising wavelength, phase code or correlation multiplexing. The method could further comprise impinging the reconstituted reference beams upon a grating or prism whereby individual reconstituted reference beams of differing wavelength are separated. The method could further comprise marking a copyright status of data within a page recorded in the holographic recording medium and determining whether the data is under copyright restriction. The page could be recorded before marking the copyright status of the data. The marking could be done in an area of a disk wherein substantially no user data is stored. The area could be a format area.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

DETAILED DESCRIPTION OF THE INVENTION

In this invention, the associative retrieval technique is employed for the novel purpose of verifying that holograms have been successfully recorded.

This invention comprises some or all of the following features. (1) A set of reference beams generated using scanning mirrors or an array of laser beam generators. (2) A list of stored addresses with a one-to-one correspondence to the reference beams. The stored addresses correspond to hologram pages or angles used to record hologram pages. The stored addresses could be stored in a microprocessor RAM memory or in a portion of the holographic recording medium. (3) A code, which could be a common pattern in all hologram pages or information from different hologram pages. (4) An probe beam modulated with the code. The object beam could be generated by an object beam modulator such as Spatial Light Modulator (SLM) and could be a collimated beam, a converging beam and a diverging beam. (5) A set of reconstituted reference beams, which could be generated by means for generating and identifying the reconstituted reference beams such as a lens for focusing waves (plane or spherical) into spots. The means for generating and identifying the reconstituted beams could be the same or different means. (6) Means for comparing the set of reference beams with the set of reconstituted beams. This means could be a hardware or software comparator. (7) Means for a parallel associative verify or an associative, post-glimpse page-wise verify.

Figure 1:
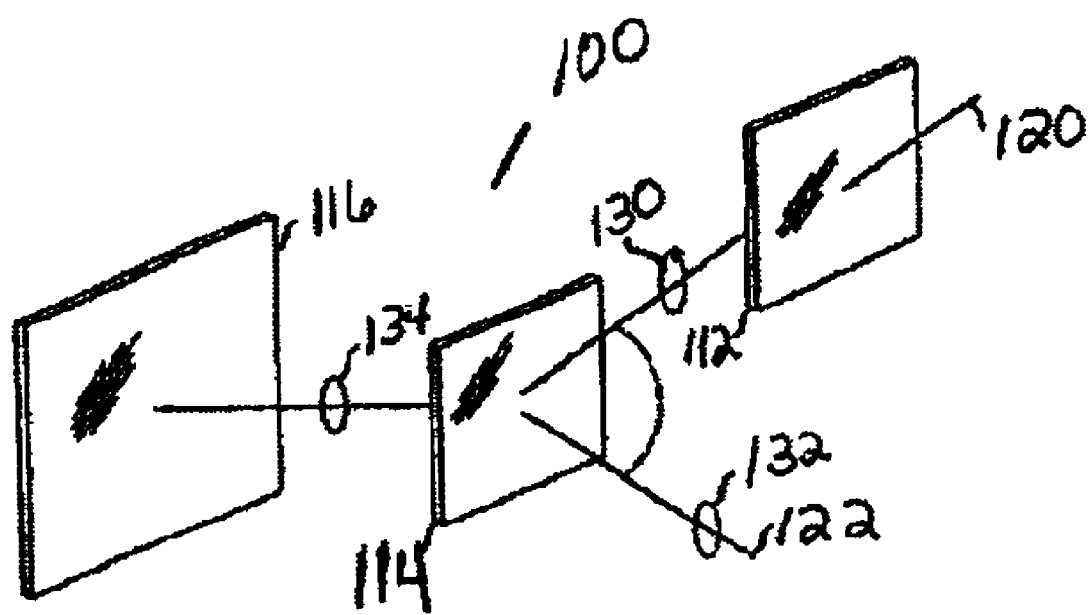
FIG. 1 shows the basic components of a holographic system.
Figure 2:
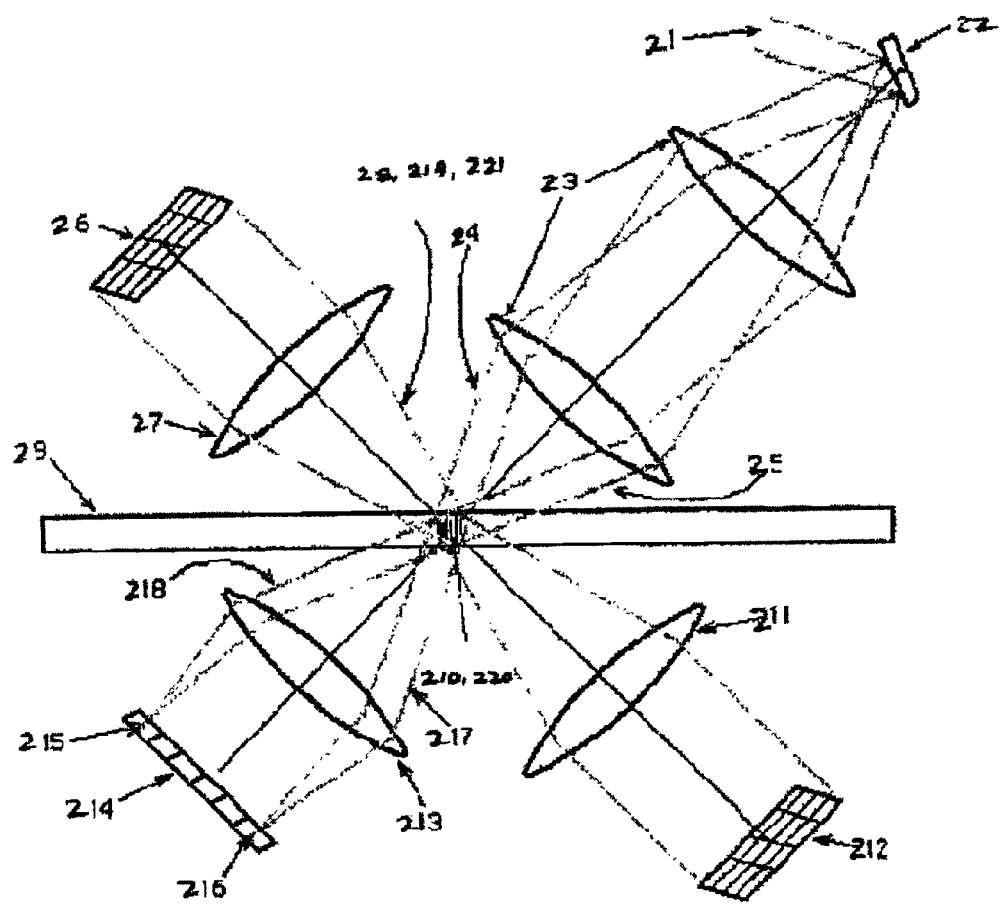
FIG. 2 is a schematic of a holographic recording device utilizing associative write verify with angle multiplexing.

Means for parallel associative verify include the structures shown in FIG. 2, particularly, collector lens 213 and linear photodetector 214. Parallel associative verify requires the verification of a plurality of holograms, which could take place at the end of a writing sequence.

Figure 3:
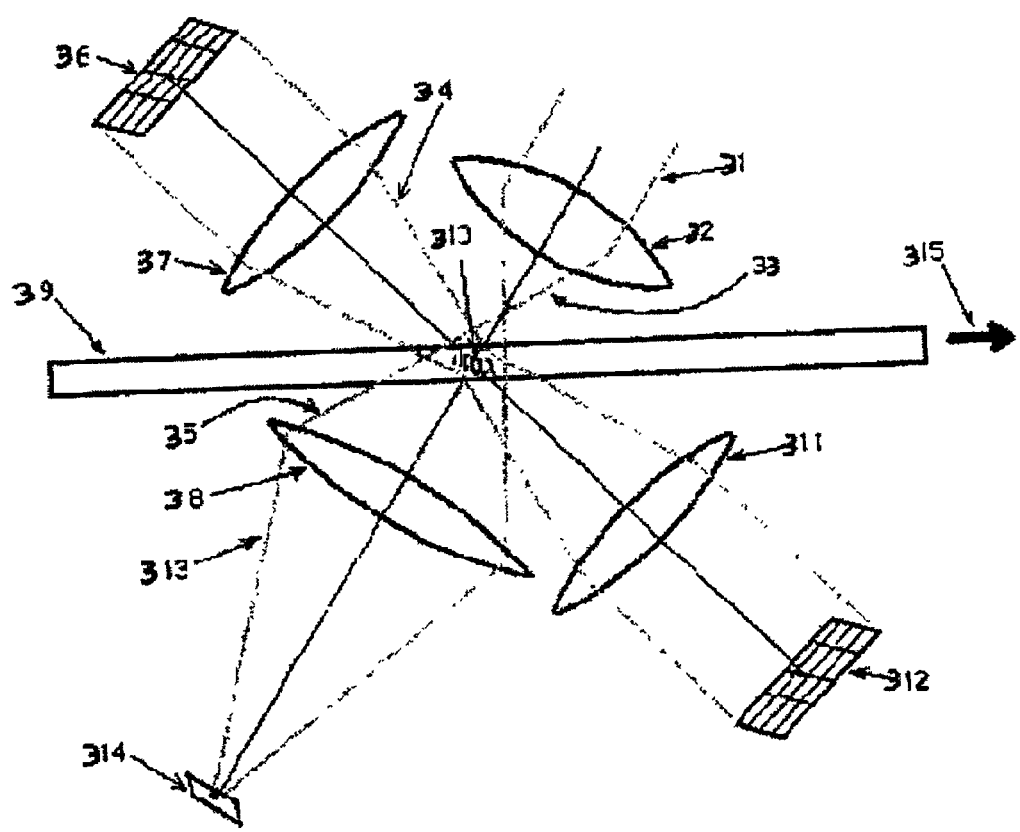
FIG. 3 is a schematic of a holographic recording device utilizing associative write verify with shift multiplexing.

Means for associative post-glimpse page-wise verify include the structures shown in FIGS. 2 and 3, particularly, collector lens 213 and 38 and linear photodetectors 214 and 314. Associative post-glimpse page-wise verify requires the verification of each hologram immediately after it is written before the next hologram is written.

In one embodiment it is possible to combine the parallel associative verify with the associative post-glimpse page-wise verify.

Preferably, the reconstituted beams are generated by diffraction in the hologram itself. They are detected by photodetectors as in the diagrams. Also, preferably, the means for comparing the set of reference beams with the set of reconstituted beams are firmware interpretation of the photodetector signals.

For an object beam modulated traditionally with a pixel-wise binary intensity distribution, the preferred embodiment of the probe beam code is the all pixels "on" state. In this case, all data pages will correlate to the probe beam to the extent that they contain "on" pixels (50% of all pixels for typical data modulation schemes), and hence will produce reconstituted reference beams in this proportion. In another embodiment of this invention, every data page (or some subset of the data pages) is composed in such a manner that it contains a fixed data pattern in part of its data-bearing modulation code (e.g., an identical field of pixels within an SLM). The fixed data pattern(s) may be added explicitly for this purpose, or they may share functionality with other fixed fields such as fiduciary marks for alignment and decoding In another embodiment, the fixed data pattern(s) may be drawn from a set of patterns, allowing those data pages with a common pattern to be verified independently of those with differing patterns. The fixed data pattern(s) in either the recorded pages and/or the probe beam may be modified in some prescribed manner (e.g., pixel shifting, or change of wavelength) that causes the reconstructed reference beam to be modified relative to the original reference beam in a predictable manner (e.g., a known angular offset), particularly, to reduce the size of the detector array.

A "random" probe beam could be used to statistically correlate to any page well enough to avoid the need to reserve fixed data pattern(s) or fiducials. One embodiment uses a probe beam with all "on" pixels. In this case, all references are reconstructed in proportion to the number of "ones" their page has (always nearly 50%), and no fixed patterns need to be set aside. In yet another embodiment of this invention, the probe beam data pattern is not fixed, but rather, assembled from portions of the data pages themselves.

When part or all of a hologram stack has been recorded, data pages that correlate with the code, e.g., a "code" that is not fixed, may be simultaneously verified by the associative retrieval method. For this operation, a probe beam is created that contains some or all of the code data pattern(s), and is used to illuminate the hologram stack. Every recorded data page that contains the code will be correlated to the probe beam, and therefore every associated reference beam will be simultaneously reconstructed.

A detector or an array of detectors is placed so as to detect the presence and/or intensity of each of the reconstructed reference beams individually (or group-wise). Failure to detect the presence or sufficient intensity of a given reconstructed reference beam is an indication that the associated data page may not have been successfully recorded. The device controller may then initiate an appropriate recovery action (e.g., rewrite the page).

The geometry of the system must be devised so that any reconstituted reference beams that are generated may be detected and identified. The embodiment illustrated in FIG. 2 shows how the invention might be implemented in an angular multiplexing system. In this case, the reconstituted reference beams will be plane waves propagating at differing angles. A lens is used to intercept the reconstituted reference waves and focus them into resolvable spots on a detector array. The embodiment illustrated in FIG. 3 shows a geometry that collects a reconstituted spherical reference beam with a lens and images the origin of the sphere onto a detector. In the most general embodiment, optical element(s) are used to separate the propagating modes of the reconstituted reference beams and resolve them individually onto detectors. For example, reference beams reconstituted in a system employing wavelength, phase code, or correlation multiplexing could impinge upon a holographic optical element (HOE) wherein each possible reconstituted reference beam has been recorded with a corresponding collimated or spherical index beam. In such a system, each reconstituted reference beam will diffract in the HOE forming a reconstituted index beam, which is subsequently focused upon a detector.

The HOE is a different element, although it may be created by holography and made out of the same material as that of the holographic recording medium. In the cases involving planar and spherical waves, one can use a lens to funnel all the energy of each reconstituted reference beam into spots that are distinct for each reference beam. While a simple lens might not be capable of doing this for complicated reference beams, a HOE can serve the same purpose. It would replace the collector lens (213 or 38) in FIGS. 2 and 3.

In a system employing wavelength multiplexing, yet another embodiment of this invention is possible wherein the reconstituted reference beams are separated from each other using a grating or a prism.

Yet another useful aspect of this invention involves the use of the correlation process to ascertain the copyright status of holographically recorded data. In this case, one or more mutually orthogonal (or nearly so) modulation codes would be used to mark the copyright status of the data within a page using a partial page mark. Then, with a single associative operation, the device could determine whether the data in a large group of pages is under copyright restriction, and permit or restrict access accordingly.

In addition to the partial page marks, entire special page (or pages) of data could be recorded before the copy-protected data is recorded which could facilitate the correlation operation to determine whether the data is to be protected as copyrighted data. For protecting entire disks rather than particular files on the disk, these copyright "mark" holograms could also be put in an area of the disk (like the format area) that user data is not normally stored. The drive could present the special page from internal memory to determine if the disk contained copyrighted data.

Desirable parameters of a holographic recording medium include storage capacity, data input and output rates, stability of stored data, and device compactness, all of which must be delivered at a specified (very low) user bit-error-rate (BER). To a large extent, the possibility of delivering such a system is limited by the properties of the materials available as storage media. The connections between materials properties and system performance are complex, and many tradeoffs are possible in adapting a given material to yield the best results.

Properties of foremost importance for holographic storage media can be broadly characterized as "optical quality," "recording properties," and "stability." These directly affect the data density and capacity that can be achieved, the data rates for input and output, and the BER.

For highest density at low BER, the imaging of the input data from the SLM to the detector must be nearly perfect, so that the detector reads each data pixel cleanly. The recording medium itself is part of the imaging system and must exhibit the same high degree of perfection. Furthermore, if the medium is moved to access different areas with the readout beam, this motion must not compromise the imaging performance. Thus, very high standards of optical homogeneity and fabrication must be maintained over the full area of the storage medium.

A more microscopic aspect of optical quality is intrinsic light scattering of the material. The detector noise floor produced by scattering of the readout beam imposes a fundamental minimum on the efficiency of a stored data hologram, and thus on the storage density and rate of data readout. In general, the best organic media have a higher scattering level than inorganic crystals, by about a factor of 100 or more.

Because holography is a volume storage method, the capacity of a holographic storage system tends to increase as the thickness of the medium increases, since greater thickness implies the ability to store more independent diffraction gratings with higher selectivity in reading out individual data pages without crosstalk from other pages stored in the same volume. For the storage densities necessary to make holography a competitive storage technology, a media thickness of at least a few millimeters is highly desirable. In some cases, particularly for organic materials, it has proven difficult to maintain the necessary optical quality while scaling up the thickness, while in other cases thickness is limited by the physics and chemistry of the recording process.

Holographic recording properties are characterized in terms of sensitivity and dynamic range. Sensitivity refers to the extent of refractive index modulation produced per unit exposure (energy per unit area). Diffraction efficiency (and thus the readout signal) is proportional to the square of the index modulation times the thickness. Thus, recording sensitivity (S) is commonly expressed in terms of the square root of diffraction efficiency, $\eta$ $$S=(\rho^{1/2})/(ILt)$$

where I is the total intensity, L is the medium thickness, and t is the exposure time; this form of sensitivity is usually given in units of cm/J. Since not all materials used are the same thickness, it is a more useful comparison to define a modified sensitivity given by the usual sensitivity times the thickness:

$$S'=SL$$

This quantity has units of $cm^2/J$ and can be thought of as the inverse of the writing fluence required for producing a standard signal level. The unprimed variable, S, might be used to convey the potential properties of a storage material, given that the particular sample under test is extremely thin; in contrast, S' quantifies the ability of a specific sample to respond to a recording exposure.

For high output data rate, one must read holograms with many pixels per page in a reasonably short time. To read a mega pixel hologram in about 1 ms with reasonable laser power and to have enough signal at the detector for low error rate, a diffraction efficiency around $\eta=3\times10^{-5}$ is required. To write such a hologram in 1 ms, to achieve input and output data rates of 1 Gb/s, the sensitivity for this example must be at least $S'=20$ $cm^2/J$.

The term "dynamic range" refers to the total response of the medium when it is divided up among many holograms multiplexed in a common volume of material; it is often parameterized as a quantity known as M # (pronounced "M-number"), where $$M\#=\Sigma\eta^{1/2}$$

and the sum is over the M holograms in one location. The M # also describes the scaling of diffraction efficiency as M is increased, i.e., $$=(M\#/M)^2$$

Dynamic range has a strong impact on the data storage density that can be achieved. For example, to reach a density of 100 bits/$\mu m^2$ (64 $Gb/in^2$) with mega pixel data pages, a target diffraction efficiency of $3\times10^{-5}$, and area at the medium of 0.1 $cm^2$ would require M#=5, a value that is barely achievable with known recording materials under exposure conditions appropriate for recording high-fidelity data holograms.

Stability is a desirable property for any data storage system. In the case of holographic storage, the response of the recording medium, which converts the optical interference pattern to a refractive index pattern (the hologram), is generally linear in light intensity and lacks the response threshold found in bi-stable storage media such as magnetic films. In the case of write-once-read-many (WORM) media such as photopolymers, the material response is irreversible; once the material has been fully exposed, further optical irradiation produces no further response, and the readout beam can interrogate the data without erasing it or distorting it. Much basic research in holographic storage has been performed using photorefractive crystals as storage media. Of these crystals, Fe-doped lithium niobate has been the workhorse. Its sensitivity is sufficient for demonstration purposes, but lacks a factor of 100 for practical application. Since photorefractive materials are reversible, they suggest the possibility of a rewritable holographic storage medium. However, because they are linear and reversible, they are subject to erasure during readout. Several schemes have been investigated for stabilizing or "fixing" the recording so that the data can be read without erasure. Recording is enabled by simultaneous irradiation of the crystal by a gating beam of different wavelength than the usual object and reference beams. In the absence of the gating wavelength, the data can be read without causing erasure. More details are given in the next section.

Stability in the dark over long periods is also an issue; organic photopolymer materials are often subject to aging processes caused by residual reactive species left in the material after recording or by stresses built up in the material during recording. Erasure may occur because of residual thermal diffusion of the molecules that record the hologram. Index modulation in photorefractive materials results from a space charge that is built up by the optical excitation and migration of mobile charge carriers. Stability in the dark depends on the trapping of these carriers with trap energies that are not thermally accessible at room temperature.

Many kinds of materials could be used as holographic storage media. Photopolymers are very promising because of their high sensitivity and dynamic range. Phenanthrenequinone-doped polymethylmethacrylate (PQ/PMMA) has excellent optical quality and is based on a photoreaction between the dopant and polymer followed by diffusion of unreacted chromophore.

In one aspect of the invention, the optical article, e.g., holographic recording medium, of the invention is formed by steps including mixing a matrix precursor and a photoactive monomer, and curing the mixture to form the matrix in situ. The matrix precursor and photoactive monomer are selected such that (a) the reaction by which the matrix precursor is polymerized during the cure is independent from the reaction by which the photoactive monomer will be polymerized during writing of a pattern, e.g., data, and (b) the matrix polymer and the polymer resulting from polymerization of the photoactive monomer (the photopolymer) are compatible with each other. The matrix is considered to be formed when the photorecording material, i.e., the matrix material plus the photoactive monomer, photoinitiator, and/or other additives, exhibits an elastic modulus of at least about $10^5$ Pa, generally about $10^5$ Pa to about $10^9$ Pa, advantageously about $10^6$ Pa to about $10^8$ Pa.

The compatibility of the matrix polymer and photopolymer tends to prevent large-scale (>100 nm) phase separation of the components, such large-scale phase separation typically leading to undesirable haziness or opacity. Utilization of a photoactive monomer and a matrix precursor that polymerize by independent reactions provides a cured matrix substantially free of cross-reaction, i.e., the photoactive monomer remains substantially inert during the matrix cure. In addition, due to the independent reactions, there is no inhibition of subsequent polymerization of the photoactive monomer. At least one photoactive monomer contains one or more moieties, excluding the monomer functional groups, that are substantially absent from the polymer matrix, i.e., it is possible to find a moiety in the photoactive monomer such that no more than 20% of all such moieties in the photorecording material are present, i.e., covalently bonded, in the matrix. The resulting optical article is capable of exhibiting desirable refractive index contrast due to the independence of the matrix from the photoactive monomer.

The formation of a hologram, waveguide, or other optical article relies on a refractive index contrast ($\Delta n$) between exposed and unexposed regions of a medium, this contrast at least partly due to monomer diffusion to exposed regions. High index contrast is desired because it provides improved signal strength when reading a hologram, and provides efficient confinement of an optical wave in a waveguide. One way to provide high index contrast in the invention is to use a photoactive monomer having moieties (referred to as index-contrasting moieties) that are substantially absent from the matrix, and that exhibit a refractive index substantially different from the index exhibited by the bulk of the matrix. For example, high contrast would be obtained by using a matrix that contains primarily aliphatic or saturated alicyclic moieties with a low concentration of heavy atoms and conjugated double bonds (providing low index) and a photoactive monomer made up primarily of aromatic or similar high-index moieties.

The matrix is a solid polymer formed in situ from a matrix precursor by a curing step (curing indicating a step of inducing reaction of the precursor to form the polymeric matrix). It is possible for the precursor to be one or more monomers, one or more oligomers, or a mixture of monomer and oligomer. In addition, it is possible that more than one type of precursor functional group can exist, either on a single precursor molecule or in a group of precursor molecules. (Precursor functional groups are the group or groups on a precursor molecule that are the reaction sites for polymerization during matrix cure.) To promote mixing with the photoactive monomer, the precursor is advantageously liquid at some temperature between about −50° C. and about 80° C. Advantageously, the matrix polymerization is capable of being performed at room temperature. Also advantageously, the polymerization is capable of being performed in a time period less than 5 minutes. The glass transition temperature ($T_g$) of the photorecording material is advantageously low enough to permit sufficient diffusion and chemical reaction of the photoactive monomer during a holographic recording process. Generally, the $T_g$ is not more than 50° C. above the temperature at which holographic recording is performed, which, for typical holographic recording, means a $T_g$ between about 80° C. and about −130° C. (as measured by conventional methods).

Examples of polymerization reactions contemplated for forming matrix polymers in the invention include cationic epoxy polymerization, cationic vinyl ether polymerization, cationic alkenyl ether polymerization, cationic allene ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), and isocyanatae-amine step polymerization (urea formation).

Several such reactions are enabled or accelerated by suitable catalysts. For example, cationic epoxy polymerization takes place rapidly at room temperature by use of $BF_3$-based catalysts, other cationic polymerizations proceed in the presence of protons, epoxy-mercaptan reactions and Michael additions are accelerated by bases such as amines, hydrosilylation proceeds rapidly in the presence of transition metal catalysts such as platinum, and urethane and urea formation proceed rapidly when tin catalysts are employed. It is also possible to use photogenerated catalysts for matrix formation, provided that steps are taken to prevent polymerization of the photoactive monomer during the photogeneration.

The photoactive monomer is any monomer or monomers capable of undergoing photoinitiated polymerization, and which, in combination with a matrix material, meets the polymerization reaction and compatibility requirements of the invention. Suitable photoactive monomers include those which polymerize by a free-radical reaction, e.g., molecules containing ethylenic unsaturation such as acrylates, methacrylates, acrylamides, methacrylamides, styrene, substituted styrenes, vinyl naphthalene, substituted vinyl naphthalenes, and other vinyl derivatives. Free-radical copolymerizable pair systems such as vinyl ether mixed with maleate and thiol mixed with olefin are also suitable. It is also possible to use cationically polymerizable systems such as vinyl ethers, alkenyl ethers, allene ethers, ketene acetals, and epoxies. It is also possible for a single photoactive monomer molecule to contain more than one monomer functional group. As mentioned previously, relatively high index contrast is desired in the article of the invention, whether for improved readout in a recording media or efficient light confinement in a waveguide. In addition, it is advantageous to induce this relatively large index change with a small number of monomer functional groups, because polymerization of the monomer generally induces shrinkage in a material.

Such shrinkage has a detrimental effect on the retrieval of data from stored holograms, and also degrades the performance of waveguide devices such as by increased transmission losses or other performance deviations. Lowering the number of monomer functional groups that must be polymerized to attain the necessary index contrast is therefore desirable. This lowering is possible by increasing the ratio of the molecular volume of the monomers to the number of monomer functional groups on the monomers. This increase is attainable by incorporating into a monomer larger index-contrasting moieties and/or a larger number of index-contrasting moieties. For example, if the matrix is composed primarily of aliphatic or other low index moieties and the monomer is a higher index species where the higher index is imparted by a benzene ring, the molecular volume could be increased relative to the number of monomer functional groups by incorporating a naphthalene ring instead of a benzene ring (the naphthalene having a larger volume), or by incorporating one or more additional benzene rings, without increasing the number of monomer functional groups. In this manner, polymerization of a given volume fraction of the monomers with the larger molecular volume/monomer functional group ratio would require polymerization of less monomer functional groups, thereby inducing less shrinkage. But the requisite volume fraction of monomer would still diffuse from the unexposed region to the exposed region, providing the desired refractive index.

The molecular volume of the monomer, however, should not be so large as to slow diffusion below an acceptable rate. Diffusion rates are controlled by factors including size of diffusing species, viscosity of the medium, and intermolecular interactions. Larger species tend to diffuse more slowly, but it would be possible in some situations to lower the viscosity or make adjustments to the other molecules present in order to raise diffusion to an acceptable level. Also, in accord with the discussion herein, it is important to ensure that larger molecules maintain compatibility with the matrix.

Numerous architectures are possible for monomers containing multiple index-contrasting moieties. For example, it is possible for the moieties to be in the main chain of a linear oligomer, or to be substituents along an oligomer chain. Alternatively, it is possible for the index-contrasting moieties to be the subunits of a branched or dendritic low molecular weight polymer.

The preferred acrylate monomers are monofunctional. These include 2,4,6-tribromophenylacrylate, pentabromoacrylate, isobornylacrylate, phenylthioethyl acrylate tetrahydrofurfurylacrylate, 1-vinyl-2-pyrrolidinone, asymmetric bis thionapthyl acrylate, 2-phenoxyethylacrylate, and the like.

In addition to the photoactive monomer, the optical article typically contains a photoinitiator (the photoinitiator and photoactive monomer being part of the overall photoimageable system). The photoinitiator, upon exposure to relatively low levels of the recording light, chemically initiates the polymerization of the monomer, avoiding the need for direct light-induced polymerizatioin of the monomer. The photoinitiator generally should offer a source of species that initiate polymerization of the particular photoactive monomer. Typically, 0.1 to 20 wt. % photoinitiator, based on the weight of the photoimageable system, provides desirable results.

A variety of photoinitiators known to those skilled in the art and available commercially are suitable for use in the invention. It is advantageous to use a photoinitiator that is sensitive to light in the visible part of the spectrum, particularly at wavelengths available from conventional laser sources, e.g., the blue and green lines of Ar+ (458, 488, 514 nm) and He—Cd lasers (442 nm), the green line of frequency doubled YAG lasers (532 nm), and the red lines of He—Ne (633 nm) and Kr+ lasers (647 and 676 nm). One advantageous free radical photoinitiator is bis($\eta$-5-2,4-cyclopentadien-1-yl)bis[2,6-difluoro-3-(1H-pyrrol-1-yl) phenyl]titanium, available commercially from Ciba as CGI-784. Another visible free-radical photoinitiator (which requires a co-initiator) is 5,7,diiodo-3-butoxy-6-fluorone, commercially available from Spectra Group Limited as H-Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. In the case of cationically polymerizable monomers, a cationic photoinitiator is used, such as a sulfonium salt or an iodonium salt. These cationic photoinitiator salts absorb predominantly in the UV portion of the spectrum, and are therefore typically sensitized with a dye to allow use of the visible portion of the spectrum. An example of an alternative visible cationic photoinitiator is ($\eta_5$-2,4-cyclopentadien-1-yl) ($\eta_6$-isopropylbenzene)-iron (II) hexafluorophosphate, available commercial from Ciba as Irgacure 261. It is also conceivable to use other additives in the photoimageable system, e.g., inert diffusing agents having relatively high or low refractive indices.

Preferably, the photoinitiators are selected according to their sensitivity to the light sources. For example, Irgacure 369, Irgacure 819, and Irgacure 907 are suitable for commercial blue laser systems. CGI-784 is suitable for green laser systems, and CB-650 is suitable for red laser systems. Irgacure and CGI are available from Ciba, CB-650 from Spectra Group.

Advantageously, for holographic recording, the matrix is a polymer formed by mercaptan-epoxy step polymerization, more advantageously a polymer formed by mercaptan-epoxy step polymerization having a polyether backbone. The polyether backbone offers desirable compatibility with several useful photoactive monomers, particularly vinyl aromatic compounds. Specifically, photoactive monomers selected from styrene, bromostyrene, divinyl benzene, and 4-methylthio-1-vinylnaphthalene (MTVN) have been found to be useful with matrix polymers formed by mercaptan-epoxy step polymerization and having a polyether backbone. A monomer that has more than one index-contrasting moiety and that is also useful with these polyether matrix polymers is 1-(3-(naphth-1-ylthio)propylthio)-4-vinylnaphthalene.

To be independent, the polymerization reactions for the matrix precursor and the photoactive monomer are selected such that: (a) the reactions proceed by different types of reaction intermediates, (b) neither the intermediate nor the conditions by which the matrix is polymerized will induce substantial polymerization of the photoactive monomer functional groups, and (c) neither the intermediate nor the conditions by which the matrix is polymerized will induce a non-polymerization reaction of the monomer functional groups that causes cross-reaction (between the monomer functional groups and the matrix polymer) or inhibits later polymerization of the monomer functional groups. According to item (a), if a matrix were polymerized by use of an ionic intermediate, it would be suitable to polymerize the photoactive monomer by use of a free radical reaction. In accordance with item (b), however, the ionic intermediate should not induce substantial polymerization of the photoactive monomer functional groups. Also in accordance with item (b), for example, one must be aware that a photoinitiated free radical matrix polymerization will typically induce a photoinitiated cationic polymerization of a photoactive monomer functional group. Thus, two otherwise independent reactions are not independent for purposes of the invention if both are driven by a single reaction condition. In accordance with item (c), for example, base-catalyzed matrix polymerization should not be performed when the photoactive monomer functional group undergoes a non-polymerization reaction in response to the base, even if polymerization of the monomer functional group is performed by an independent reaction. A specific example is that a base-catalyzed epoxy-mercaptan polymerization should not be used with an acrylate monomer because, although the acrylate is polymerized by a free radical reaction, the acrylate will react with the mercaptans under base catalysis, resulting in a cross-reaction.

Table 1 below illustrates some examples of matrix/photoactive monomer combinations where the matrix polymerization reaction and photoactive monomer polymerization are capable of being independent, and examples where the polymerizations interfere with each other. (Photoactive monomers are horizontal, and matrix polymers are vertical. "X" indicates cross-reaction or monomer polymerization during matrix polymerization. "O" indicates independent reactions. "I" indicates that the photoactive monomer polymerization is inhibited by the reagents or reaction that form the polymeric matrix, e.g., the photoactive monomer functional group is converted to a non-polymerizing group, or chemical species are present after the matrix cure that substantially slow the rate or yield of polymerization of the monomer functional groups.)

TABLE 1

|  | (Meth) acrylates | Styrene Derivatives | Vinyl Ethers | Epoxies |
|---|---|---|---|---|
| Cationic Epoxy | O | O | X | X |
| Cationic Vinyl Ethers | O | O | X | X |
| Epoxy (amine) | X | O | I | X |
| Epoxy (mercaptan) | X | O | I | X |
| Unsaturated ester (amine) | X | O | I | X |
| Unsaturated ester (mercaptan) | X | O | I | X |
| Hydrosilylation | X | X | X | O |
| Urethane formation | O | O | O | X |

For purposes of the invention, polymers are considered to be compatible if a blend of the polymers is characterized, in 90° light scattering, by a Rayleigh ratio ($R_{90°}$) less than $7\times10^{-3}$ cm$^{-1}$. The Rayleigh ratio, $R_\theta$, is a conventionally known property, and is defined as the energy scattered by a unit volume in the direction θ, per steradian, when a medium is illuminated with a unit intensity of unpolarized light, as discussed in M. Kerker, *The Scattering of Light and Other Electromagnetic Radiation*, Academic Press, San Diego, 1969. The light source used for the measurement is generally a laser having a wavelength in the visible part of the spectrum. Normally, the wavelength intended for use in writing holograms is used. The scattering measurements are made upon a photorecording material that has been flood exposed. The scattered light is collected at an angle of 90° from the incident light, typically by a photodetector. It is possible to place a narrowband filter, centered at the laser wavelength, in front of such a photodetector to block fluorescent light, although such a step is not required. The Rayleigh ratio is typically obtained by comparison to the energy scatter of a reference material having a known Rayleigh ratio.

Polymer blends that are considered to be miscible, e.g., according to conventional tests such as exhibition of a single glass transition temperature, will typically be compatible as well, i.e., miscibility is a subset of compatibility. Standard miscibility guidelines and tables are there from useful in selecting a compatible blend. However, it is possible for polymer blends that are immiscible to be compatible according to the light scattering test above.

A polymer blend is generally considered to be miscible if the blend exhibits a single glass transition temperature, $T_g$, as measured by conventional methods. An immiscible blend will typically exhibit two glass transition temperatures corresponding to the $T_g$ values of the individual polymers. $T_g$ testing is most commonly performed by differential scanning calorimetry (DSC), which shows the $T_g$ as a step change in the heat flow (typically the ordinate). The reported $T_g$ is typically the temperature at which the ordinate reaches the mid-point between extrapolated baselines before and after the transition. It is also possible to use Dynamic Mechanical Analysis (DMA) to measure $T_g$. DMA measures the storage modulus of a material, which drops several orders of magnitude in the glass transition region. It is possible in certain cases for the polymers of a blend to have individual $T_g$ values that are close to each other. In such cases, conventional methods for resolving such overlapping $T_g$ should be used, such as discussed in Brinke et al., "The thermal characterization of multi-component systems by enthalpy relaxation," *Thermochimica Acta.*, 238 (1994), at 75.

Matrix polymer and photopolymer that exhibit miscibility are capable of being selected in several ways. For example, several published compilations of miscible polymers are available, such as O. Olabisi et al, *Polymer—Polymer Miscibility*, Academic Press, New York, 1979; L. M. Robeson, *MMI, Press Symp. Ser.*, 2, 177, 1982; L. A. Utracki, *Polymer Alloys and Blends: Thermodynamics and Rheology*, Hanser Publishers, Munich, 1989; and S. Krause in *Polymer Handbook*, J. Brandrup and E. H. Immergut, Eds., 3rd Ed., Wiley Interscience, New York, 1989, pp. VI 347–370, the disclosures of which are hereby incorporated by reference. Even if a particular polymer of interest is not found in such references, the approach specified allows determination of a compatible photorecording material by employing a control sample.

Determination of miscible or compatible blends is further aided by intermolecular interaction considerations that typically drive miscibility. For example, it is well known that polystyrene and poly(methylvinylether) are miscible because of an attractive interaction between the methyl ether group and the phenyl ring. It is therefore possible to promote miscibility, or at least compatibility, of two polymers by using a methyl ether group in one polymer and a phenyl group in the other polymer. It has also been demonstrated that immiscible polymers are capable of being made miscible by the incorporation of appropriate functional groups that can provide ionic interactions. (See Z. L. Zhou and A. Eisenberg, *J. Polym. Sci., Polym. Phys. Ed.*, 21 (4), 595, 1983; R. Murali and A. Eisenberg, *J. Polym. Sci., Part B: Polym. Phys.*, 26 (7), 1385, 1988; and A Natansohn et al., *Makromol. Chem., Macromol. Symp.*, 16, 175, 1988). For example polyisoprene and polystyrene are immiscible. However, when polyisoprene is partially sulfonated (5%), and 4-vinyl pyridine is copolymerized with the polystyrene, the blend of these two functionalized polymers is miscible. It is contemplated that the ionic interaction between the sulfonated groups and the pyridine group (proton transfer) is the driving force that makes this blend miscible. Similarly, polystyrene and poly(ethyl acrylate), which are normally immiscible, have been made miscible by lightly sulfonating the polystyrene. (See R. E. Taylor-Smith and R. A. Register, *Macromolecules*, 26, 2802, 1993.) Charge-transfer has also been used to make miscible polymers that are otherwise immiscible. For example it has been demonstrated that, although poly(methyl acrylate) and poly(methyl methacrylate) are immiscible, blends in which the former is copolymerized with (N-ethylcarbazol-3-yl)methyl acrylate (electron donor) and the latter is copolymerized with 2-[(3, 5-dinitrobenzoyl)oxy]ethyl methacrylate (electron acceptor) are miscible, provided the right amounts of donor and acceptor are used. (See M. C. Piton and A. Natansohn, *Macromolecules*, 28, 15, 1995.) Poly(methyl methacrylate) and polystyrene are also capable of being made miscible using the corresponding donor-acceptor co-monomers (See M. C. Piton and A. Natansohn, *Macromolecules*, 28, 1605, 1995).

A variety of test methods exist for evaluating the miscibility or compatibility of polymers, as reflected in the recent overview published in A. Hale and H. Bair, Ch. 4—"Polymer Blends and Block Copolymers," *Thermal Characterization of Polymeric Materials*, 2nd Ed., Academic Press, 1997. For example, in the realm of optical methods, opacity typically indicates a two-phase material, whereas clarity generally indicates a compatible system. Other methods for evaluating miscibility include neutron scattering, infrared spectroscopy (IR), nuclear magnetic resonance (NMR), x-ray scattering and diffraction, fluorescence, Brillouin scattering, melt titration, calorimetry, and chemilluminescence. See, for example, L. Robeson, supra; S. Krause, *Chemtracts-Macromol. Chem.*, 2, 367, 1991a; D. Vessely in *Polymer Blends and Alloys*, M. J. Folkes and P. S. Hope, Eds., Blackie Academic and Professional, Glasgow, pp. 103–125; M. M. Coleman et al. *Specific Interactions and the Miscibility of Polymer Blends*, Technomic Publishing, Lancaster, Pa., 1991; A. Garton, *Infrared Spectroscopy of Polymer Blends, Composites and Surfaces*, Hanser, N.Y., 1992; L. W. Kelts et al., *Macromolecules*, 26, 2941, 1993; and J. L. White and P. A. Mirau, *Macromolecules*, 26, 3049, 1993; J. L. White and P. A. Mirau, *Macromolecules*, 27, 1648, 1994; and C. A. Cruz et al., *Macromolecules*, 12, 726, 1979; and C. J. Landry et al., *Macromolecules*, 26, 35, 1993.

Compatibility has also been promoted in otherwise incompatible polymers by incorporating reactive groups into the polymer matrix, where such groups are capable of reacting with the photoactive monomer during the holographic recording step. Some of the photoactive monomer will thereby be grafted onto the matrix during recording. If there are enough of these grafts, it is possible to prevent or reduce phase separation during recording. However, if the refractive indexes of the grafted moiety and of the monomer are relatively similar, too many grafts, e.g., more than 30% of monomers grafted to the matrix, will tend to undesirably reduce refractive index contrast.

A holographic recording medium of the invention is formed by adequately supporting the photorecording material, such that holographic writing and reading is possible. Typically, fabrication of the medium involves depositing the matrix precursor/photoimageable system mixture between two plates using, for example, a gasket to contain the mixture. The plates are typically glass, but it is also possible to use other materials transparent to the radiation used to write data, e.g., a plastic such as polycarbonate or poly(methyl methacrylate). It is possible to use spacers between the plates to maintain a desired thickness for the recording medium. During the matrix cure, it is possible for shrinkage in the material to create stress in the plates, such stress altering the parallelism and/or spacing of the plates and thereby detrimentally affecting the medium's optical properties. To reduce such effects, it is useful to place the plates in an apparatus containing mounts, e.g., vacuum chucks, capable of being adjusted in response to changes in parallelism and/or spacing. In such an apparatus, it is possible to monitor the parallelism in real-time by use of a conventional interferometric method, and make any necessary adjustments during the cure. Such a method is discussed, for example, in U.S. patent application Ser. No. 08/867,563, the disclosure of which is hereby incorporated by reference. The photorecording material of the invention is also capable of being supported in other ways. For instance, it is conceivable to dispose the matrix precursor/photoimageable system mixture into the pores of a substrate, e.g., a nanoporous glass material such as Vycor, prior to matrix cure. More conventional polymer processing is also envisioned, e.g., closed mold formation or sheet extrusion. A stratified medium is also contemplated, i.e., a medium containing multiple substrates, e.g., glass, with layers of photorecording material disposed between the substrates.

The medium of the invention is then capable of being used in a holographic system such as discussed previously. The amount of information capable of being stored in a holographic medium is proportional to the product of: the refractive index contrast, $\Delta n$, of the photorecording material, and the thickness, d, of the photorecording material. (The refractive index contrast, $\Delta n$, is conventionally known, and is defined as the amplitude of the sinusoidal variations in the refractive index of a material in which a plane-wave, volume hologram has been written. The refractive index varies as: $n(x)=n_0+\Delta n \cos(K_x)$, where $n(x)$ is the spatially varying refractive index, x is the position vector, K is the grating wavevector, and $n_0$ is the baseline refractive index of the medium. See, e.g., P. Hariharan, *Optical Holography: Principles, Techniques, and Applications*, Cambridge University Press, Cambridge, 1991, at 44.) The $\Delta n$ of a material typically calculated from the diffraction efficiency or efficiencies of a single volume hologram or a multiplexed set of volume holograms recorded in a medium. The $\Delta n$ is associated with a medium before writing, but is observed by measurement performed after recording. Advantageously, the photorecording material of the invention exhibits a $\Delta$ of $3\times10^{-3}$ or higher.

Examples of other optical articles include beam filters, beam steerers or deflectors, and optical couplers. (See, e.g., L. Solymar and D. Cooke, *Volume Holography and Volume Gratings*, Academic Press, 315–327 (1981), the disclosure of which is hereby incorporated by reference.) A beam filter separates part of an incident laser beam that is traveling along a particular angle from the rest of the beam. Specifically, the Bragg selectivity of a thick transmission hologram is able to selectively diffract light along a particular angle of incidence, while light along other angle travels undeflected through the hologram. (See, e.g., J. E. Ludman et al., "Very thick holographic nonspatial filtering of laser beams," *Optical Engineering, Vol.* 36, No. 6, 1700 (1997), the disclosure of which is hereby incorporated by reference.) A beam steerer is a hologram that deflects light incident at the Bragg angle. An optical coupler is typically a combination of beam deflectors that steer light from a source to a target. These articles, typically referred to as holographic optical elements, are fabricated by imaging a particular optical interference pattern within a recording medium, as discussed previously with respect to data storage. Medium for these holographic optical elements are capable of being formed by the techniques discussed herein for recording media or waveguides.

The material principles discussed herein are applicable not only to hologram formation, but also to formation of optical transmission devices such as a waveguide and beam apodizer. Polymeric optical waveguides are discussed for example in B. L. Booth, "Optical Interconnection Polymers," in *Polymers for Lightwave and Integrated Optics, Technology and Applications*, L. A. Hornak, ed., Marcel Dekker, Inc. (1992); U.S. Pat. No. 5,292,620; and U.S. Pat. No. 5,219,710, the disclosures of which are hereby incorporated by reference. Essentially, the recording material of the invention is irradiated in a desired waveguide pattern to provide refractive index contrast between the waveguide pattern and the surrounding (cladding) material. It is possible for exposure to be performed, for example, by a focused laser light or by use of a mask with a non-focused light source. Generally, a single layer is exposed in this manner to provide the waveguide pattern, and additional layers are added to complete the cladding, thereby completing the waveguide. The process is discussed for example at pages 235–36 of Booth, supra, and Cols. 5 and 6 of U.S. Pat. No. 5,292,620. A benefit of the invention is that by using conventional molding techniques, it is possible to mold the matrix/photoimageable system mixture into a variety of shapes prior to matrix cure. For example, the matrix/photoimageable system mixture can be molded into ridge waveguides, wherein refractive index patterns are then written into the molded structures. It is thereby possible to easily form structures such as Bragg gratings. This feature of the invention increases the breadth of applications in which such polymeric waveguides would be useful.

In one aspect of the invention, the object beam is a Fourier plane diffraction pattern of a pixel-wise binary intensity modulated data page. The probe is preferably generated by the same means as the object beam, but with all pixels in the data modulator set to the "on" (high intensity) state.

In yet another aspect of the invention, the reference beam is a spherical reference beam. A "spherical reference beam" means the phase fronts (or wave fronts) of the beam fall on spherical surfaces.

The present invention will be better understood with reference to the following examples. These examples are intended to illustrate specific embodiments within the overall scope of the invention as claimed.

EXAMPLE 1

Associative Write Verify with Angle Multiplexing

A schematic illustration of a holographic recording device utilizing associative write verify is illustrated in FIG. 2. In this example, Fourier plane holograms are recorded in a transmissive geometry using angle multiplexing. This description is broken down into stages: one or more write operations performed according to methods established in prior art; and one or more verify operations performed utilizing the novel technique of associative write verify.

Write Operations

Impinging collimated light beam 21 upon rotatable mirror 22 while mirror 22 is held at a fixed angle of rotation performs a holographic write operation. The reflected beam passes through 4-f scanner assembly 23 and forms a first collimated reference beam 24, which impinges upon holographic recording medium 29.

Meanwhile, spatial light modulator (SLM) 26 is electronically configured to display a first dark and light data pattern and illuminated by light coherent with beam 21. The resulting data-bearing light beam passes through Fourier-transform lens 27 to form a first object beam 28 which impinges upon holographic recording medium 29 such that object beam 28 overlaps reference beam 24 within the volume of medium 29.

Because the two beams are mutually coherent, an interference pattern of light and dark fringes is established in the overlap region. The bright fringes initiate photochemical reactions in the medium 29 that locally change the index of refraction to create a first set of Bragg gratings 210. After a sufficient exposure time, the reference beam 24 and the object beam 28 are turned off. The recorded Bragg gratings 210 persist in the medium; in aggregate, they constitute a hologram.

A plurality of holograms may be recorded in a substantially overlapping volume of medium 29. For example, to record a second hologram, rotatable mirror 22 is rotated to a second fixed angle of rotation. Collimated light beam 21 is again reflected off of mirror 22, this time taking a second path through 4-f scanner assembly 23 to form a second collimated reference beam 25 which passes through the medium 29 at a different angle than the first collimated reference beam 24. Meanwhile, SLM 26 is electronically configured to display a second dark and light data pattern and illuminated by light coherent with beam 21. The resulting second data-bearing light beam passes through Fourier-transform lens 27 to form a second object beam 219, which is substantially collinear with the first object beam 28 (no longer present). The interference pattern between the second reference beam 25 and the second object beam record a second set of Bragg gratings 220 which substantially overlap the first set of Bragg gratings 210.

Many more holograms may be written in this same volume by using different mirror rotation angles of the rotatable mirror to create more reference beams impinging on the medium at differing angles.

Associative Verify Operations

After one or more write operations has been performed as described above, an associative write verify operation may be performed in order to simultaneously detect the presence of the Bragg grating sets, thus verifying the success of the write operation(s).

In the above example, the presence of Bragg grating sets 210 and 220 can be simultaneously detected by electronically configuring SLM 26 to display a third dark and light data pattern with elements common to both the first and second dark and light data patterns. For example, the SLM could be set entirely to the "on" (light) state, and illuminated. The resulting light beam passes through the Fourier transform lens 27 to form a probe beam 221, which is substantially collinear with object beams 28 and 219 (no longer present). For the verify operation, collimated light beam 21 is not present (it is either blocked or turned off), so neither of reference beams 24 or 25 are present.

If Bragg gratings 210 are present in the medium, then some portion of probe beam 221 will be Bragg matched to some of Bragg gratings 210, and thus will diffract to form a first reconstructed reference beam 217 which replicates the original first reference beam 24 used to record Bragg gratings 210. Similarly, if Bragg gratings 220 are present, some portion of probe beam 221 will diffract to form a second reconstructed reference beam 218 which replicates the associated second reference beam 25. Reconstructed reference beams 217 and 218 will have intensity proportional to the strength of Bragg grating sets 210 and 220 respectively, and will both be reconstructed simultaneously. The reconstructed reference beams then impinge upon collector lens 213, which is positioned to capture all possible reconstructed reference beams. Linear photodetector array 214 is positioned at the back focal plane of collector lens 213 so that reconstructed reference beams 217 and 218 are focused upon distinguishable spots 216 and 215 respectively on linear photodetector array 214. Linear photodetector array 214 generates independent electrical signals proportional to the intensity of focused spots 216 and 215. Since the magnitudes of the electrical signals are proportional to the intensities of reconstructed reference beams 217 and 218 respectively, which are in turn proportional to the strength of Bragg grating sets 210 and 220 respectively, the magnitudes of the electrical signals can be used to independently and simultaneously confirm (verify) that Bragg grating sets 210 and 220 are present and of sufficient strength.

Many more holograms can simultaneously be verified by insuring that the length of the linear photodetector array is sufficient to capture the focused spots arising from every possible reconstructed reference beam, and that the resolution of the linear photodetector array is sufficient to independently distinguish the intensity of each possible focused spot.

EXAMPLE 2

Associative Verify with Shift Multiplexing

In shift multiplexing, holograms are multiplexed by slightly shifting (e.g., much less than a hologram width) the position of the medium relative to the object and reference beams between write exposures. Associative write verify can also be performed with shift multiplexing using spherical reference waves, although in this implementation only a single hologram can be verified at once.

Angle multiplexing is a method of for storing a plurality of images within a single photorefractive medium. Such angle multiplexing is described by P. J. van Heerden in, "Theory of Optical Information Storage In solids," Applied Optics, Vol. 2, No. 4, page 393 (1963), incorporated herein by reference. Angle multiplexing generally involves maintaining a constant angle for an information carrying object beam, while varying the angle of a reference beam for each exposure. A different interference pattern thereby can be created for each of a plurality of different reference beam angles. Each different interference pattern corresponds to a different hologram. Angle multiplexing thus allows a larger number of holograms to be stored within a common volume of photorefractive medium, thereby greatly enhancing the storage density of the medium.

U.S. Pat. No. 5,793,504 entitled HYBRID ANGULAR/ SPATIAL HOLOGRAPHIC MULTIPLEXER, incorporated herein by reference, describes a method of angularly and spatially multiplexing a plurality of holograms within a storage medium. According to that patent, since diffraction efficiency of stored holograms varies, at least approximately, inversely with the square of the number of holograms stored, there is a limit to the number of holograms that can be stored within a given volume of a particular storage medium. Therefore, spatial multiplexing is employed to store different sets of holograms in different volume locations within a storage medium. The patent states that storing sets of holograms in spatially separated locations mitigates the problem of undesirable simultaneous excitation of holograms from different sets by a common reference beam.

Referring to FIG. 3, spherical reference beam 33 is created by impinging collimated beam 31 upon lens with high numerical aperture 32. Spherical reference beam 33 substantially overlaps object beam 34 within the volume of the medium 39 so as to create Bragg gratings 310 in a manner similar to the write process described for angle multiplexing above.

The associative verify operation is performed by removing reference beam 33 (e.g., by blocking collimated beam 31 with a shutter) after the exposure is complete, while leaving object beam 34 on. Bragg gratings 310, if present, will necessarily be Bragg-matched to object beam 34, and will cause diffraction creating reconstructed reference beam 35. Reconstructed reference beam 35 is then collected by collecting lens 38 and directed to photodetector 314. The magnitude of the signal detected by photodetector 314 is proportional to the intensity of reconstructed reference beam 35, which is in turn proportional to the strength of Bragg gratings 310.

Because the original dark and light data pattern is still present on the SLM, the object beam will correlate perfectly with the hologram constituted by Bragg gratings 310. Furthermore, collecting lens 38 concentrates the light from the entire reconstructed reference beam 35 onto the single photodetector 314. For these reasons, the exposure time required to accurately determine the aggregate strength of Bragg gratings 310 using associative write verify is much less than the exposure time required to verify the hologram by reading it in the traditional manner using camera array 312. This is advantageous not only from a throughput standpoint, but also because the act of reading exposes the media, thereby using up some of its dynamic range and reducing its overall data storage capacity.

In this example, the medium would be shifted slightly in the direction indicated by arrow 315, thereby causing a Bragg mismatch between the subsequent object beam 34 and the previously written Bragg gratings 310. Thus, there will be negligible cross talk caused by previously written gratings when verifying subsequent holograms.

EXAMPLE 3

Associative, Post-Glimpse Page-Wise Verify

After a write exposure, the reference beam is turned off 10–100 microseconds before turning off the object path, thereby the object beam is left on a few microseconds longer than the reference beam. "Object path" is the path the object beam takes through the optics. Since the full page is still loaded on the SLM, a 1—1 correlation exists between the probe beam and the hologram, resulting in a reconstructed reference beam with power equal to the diffraction efficiency times the probe beam power. By focusing the potential reconstructed beams onto a linear detector, an exposure time of only 10–100 microseconds is needed and write rate reduction is minimal. The transfer rate is the data rate, here, overall writing rate in bytes/second.

If each page would not be fully read after being written, one would cut the writing rate by about half. This method could be much faster since all the photons go to a single sensor (rather than being divided up among a million separate pixel sensors), so the exposure is for a very short time.

By verifying every page after writing, the dynamic range of media is reduced and results in a 0.8% to 3.9% loss in capacity (depending on laser power, optics, and diffraction efficiency of the hologram). However, the dynamic range loss can be eliminated by changing this method to an end-of-stack, full-page verify where all the pages in the stack (stored in buffer) are sequentially reloaded onto the SLM and illuminated onto the stack. In this case, there would be no dynamic range loss but the aggregate transfer rate would slowed by the number of pages in the stack multiplied by the sum of the SLM load time and the exposure time of the linear detector. Still, this end-of-stack, full-page verify method is one to four orders of magnitude faster than a full-page reconstruction with no loss of dynamic range in the media.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. An associative write verify system for a holographic recording medium, comprising (1) a hologram, (2) an object beam, (3) a reference beam, (4) a probe beam, (5) a reconstituted reference beam and (6) means for comparing the reference beam with the reconstituted reference beam, wherein the system implements an associative write verify during holographic recording of data, wherein the holographic recording medium has a Rayleigh ratio ($R_{90°}$) of less than $7 \times 10^{-3}$ cm$^{-1}$.

2. The system of claim 1, further comprising a stored address with a one-to-one correspondence to the reference beam.

3. The system of claim 1, further comprising a code comprising a data pattern within the object beam.

4. The system of claim 3, wherein the probe beam is modulated to match the code.

5. The system of claim 1, wherein the means for comparing the reference beam with the reconstituted reference beam comprises means for detecting the reconstituted reference beam.

6. The system of claim 1, wherein the associative write verify is selected from the group consisting of a parallel associative write verify, a post-glimpse page-wise verify and combinations thereof.

7. The system of claim 2, wherein the stored address corresponds to a hologram page or a reference beam angle used to record a hologram page.

8. The system of claim 7, wherein the stored address is stored in a microprocessor RAM memory or in portion of the holographic recording medium.

9. The system of claim 2, wherein the code is a pattern in a hologram page or information from different hologram pages.

10. The system of claim 1, wherein the probe beam is generated by an object beam modulator.

11. The system of claim 1, wherein the reference beam is a plane wave reference beam generated using scanning mirrors or an array of laser beam generators.

12. The system of claim 1, wherein the reconstituted reference beam is collected by a lens.

13. The system of claim 1, wherein said means for comparing the reference beam with the reconstituted reference beam comprises a hardware or software comparator.

14. The system of claim 1, further comprising means for associative, post-glimpse page-wise verify.

15. The system of claim 14, wherein the means for associative, post glimpse page-wise verify comprises detection of the reconstituted reference beam while an original data pattern remains on a modulator after writing.

16. The system of claim 1, wherein the holographic recording medium is an optically flat planar medium.

17. The system of claim 1, wherein the reconstituted reference beam is detected with a photo detector.

18. The system of claim 1, wherein the holographic recording medium is a holographic recording medium comprising a polymer matrix.

19. The system of claim 18, wherein the holographic recording medium has a thickness greater than 200 $\mu$m and a refractive index contrast ($\Delta$n) of $3\times10^{-3}$ or higher.

20. The system of claim 1, wherein the system has a probe pattern and/or geometry capable of detecting and identifying the reconstituted reference beam.

21. The system of claim 20, wherein said probe pattern and/or geometry for an angular multiplexing system comprises a lens to intercept the reconstituted reference beam and focus the reconstituted reference beam into a resolvable spot on a detector array, the reconstituted reference beam being a plane wave.

22. The system of claim 20, wherein said probe pattern and/or geometry is capable of collecting the reconstituted reference beam with a lens and imaging an origin of the spherical beam onto a detector, the reconstituted reference beam being a spherical beam.

23. The system of claim 20, wherein said probe pattern and/or geometry comprises optical elements for separating the propagating modes of the reconstituted reference beam into separated mode reconstituted reference beams and resolving said separated mode reconstituted reference beams onto a detector.

24. The system of claim 3, wherein the code comprises one or more substantially mutually orthogonal modulation codes for marking a copyright status of data within a page recorded in the holographic recording medium.

25. The system of claim 1, wherein a copy of the data is kept in a buffer during the holographic recording of the data.

26. A method for associative write verify system for a holographic recording medium, comprising (1) interfering an object beam with a reference beam onto the holographic recording medium to form a hologram; (2) shining a probe beam; (3) forming a reconstituted reference beam and (4) comparing the reference beam with the reconstituted reference beam, wherein the method implements an associative write verify during holographic recording of data, wherein the holographic recording medium has a Rayleigh ratio ($R_{90°}$) of less than $7\times10^{-3}$ cm$^{-1}$.

27. The method of claim 26, further comprising a stored address with a one-to-one correspondence to the reference beam.

28. The method of claim 27, wherein the stored address corresponds to a hologram page or a reference beam angle used to record a hologram page.

29. The method of clam 27, wherein the code is a pattern in a hologram page or information from different hologram pages.

30. The method of claim 28, wherein the stored address is stored in a microprocessor RAM memory or in a portion of the holographic recording medium.

31. The method of claim 26, further comprising a code comprising a data pattern within the object beam.

32. The method of claim 26, wherein the probe beam is modulated to match the code.

33. The method of claim 26, wherein the comparing is done by means for comparing the reference beam with the reconstituted reference beam that comprises means for detecting the reconstitute reference beam.

34. The method of claim 26, wherein the associative write verify is selected from the group consisting a parallel associative write verify, a post-glimpse page-wise verify and combinations thereof.

35. The method of claim 26, wherein the probe beam is generated by an object beam modulator.

36. The method of claim 26, wherein the reference beam is a plane wave reference beam generated using scanning mirrors or an array of laser beam generators.

37. The method of claim 26, wherein the reconstituted reference beam is collected by a lens.

38. The method of claim 26, wherein said comparing is done by means for comparing the reference beam with the reconstituted reference beam that comprises a hardware or software comparator.

39. The method of claim 26, further comprising means for associative, post-glimpse page-wise verify.

40. The method of claim 39, wherein the means for associative, post glimpse page-wise verify comprises detection of the reconstituted reference beam while an original data pattern remains on a modulator after writing.

41. The method of claim 26, wherein the holographic recording medium is an optically flat planar medium.

42. The method of claim 25, wherein the reconstituted reference beam is detected with a photo detector.

43. The method of claim 26, wherein the holographic recording medium is a holographic recording medium comprising a polymer matrix.

44. The method of claim 43, wherein the holographic recording medium has a thickness greater than 200 $\mu$m and a refractive index contrast ($\Delta$n) of $3\times10^{-3}$ or higher.

45. The method of claim 26, further comprising impinging the reconstituted reference beam upon holographic optical element, wherein the reconstituted reference beam is recorded with a corresponding collimated or spherical index beam.

46. The method of claim 45, wherein the reconstituted reference beam is reconstituted in a system comprising wavelength, phase code or correlation multiplexing.

47. The method of claim 26, further comprising impinging the reconstituted reference beams upon a grating or prism whereby individual reconstituted reference beams of differing wavelength are separated.

48. The method of claim 26, further comprising marking a copyright status of data within a page recorded in the holographic recording medium and determining whether the data is under copyright restriction.

49. The method of claim 48, wherein the page is recorded before marking the copyright status of the data.

50. The method of claim 48, wherein said marking is done in an area of a disk wherein substantially no user data is stored.

51. The method of claim 50, wherein the area is a format area.

52. An associative write verify system for a holographic recording medium, comprising (1) a hologram, (2) an object beam, (3) a reference beam, (4) a probe beam, (5) a reconstituted reference beam and (6) photodetector, wherein the system implements an associative write verify during holographic recording, wherein the holographic recording medium has a Rayleigh ratio ($R_{90°}$) of less than $7 \times 10^{-3}$ $cm^{-1}$.

* * * * *